US006474753B1

(12) United States Patent
Rieth et al.

(10) Patent No.: US 6,474,753 B1
(45) Date of Patent: Nov. 5, 2002

(54) AUTOMATICALLY ACTUATED BRAKING SYSTEM

(75) Inventors: Peter Rieth, Eltville; Jochen Burgdorf, Offenbach; Alfred Eckert, Mainz Hechtsehim, all of (DE)

(73) Assignee: Continental Teves AG & Co., OHG, Frankfurt (DE)

( * ) Notice: Subject to any disclaimer, the term of this patent is extended or adjusted under 35 U.S.C. 154(b) by 0 days.

(21) Appl. No.: 09/242,778

(22) PCT Filed: Aug. 15, 1997

(86) PCT No.: PCT/EP97/04466

§ 371 (c)(1), (2), (4) Date: Jun. 11, 1999

(87) PCT Pub. No.: WO98/07602

PCT Pub. Date: Feb. 26, 1998

(30) Foreign Application Priority Data

Aug. 21, 1996 (DE) ........................................ 196 33 736

(51) Int. Cl.[7] ............................ B60T 17/04; B60T 8/00

(52) U.S. Cl. ................................ 303/191; 188/DIG. 1; 303/20; 303/3; 303/125; 303/135; 303/113.4; 180/271

(58) Field of Search .............................. 303/191, 3, 20, 303/193, 125, 135, 16, 113.4; 701/93, 68, 58, 90, 51, 96; 188/DIG. 1; 74/512, 510; 340/435, 467, 463, 464, 466, 479; 427/184, 93, 208; 180/271, 169, 168, 178, 170, 171, 272, 175; 250/221; 307/10.8

(56) References Cited

U.S. PATENT DOCUMENTS 2,266,213 A * 12/1941 Kattwinkel
3,726,369 A * 4/1973 Esteves ...................... 477/184
3,795,426 A * 3/1974 Sisson ...................... 303/114.3
4,076,093 A * 2/1978 Mizuno ...................... 188/265

(List continued on next page.)

FOREIGN PATENT DOCUMENTS

DE 26 38 144 3/1978
DE 89 11 963 2/1990
DE 40 17 045 11/1991

(List continued on next page.)

OTHER PUBLICATIONS

Search Report of the German Patent Office for German Appl. No. 196 33 736.4.

*Primary Examiner*—Douglas C. Butler
(74) *Attorney, Agent, or Firm*—Rader, Fishman & Grauer PLLC

(57) ABSTRACT

For externally actuating a brake system, both the surroundings of the brake pedal and, if necessary, additional parameters (d,d ,$V_{ref}$) are monitored a sensor unit (6,10,11). Then the brake pressure ($p_{nom}$) will be set automatically in an expedient manner in dependence of the individual parameters that were evaluated. Advantageous further embodiments include proposals for precharging the brake or braking slightly or automatically applying a higher brake pressure in dependence of the measuring results, in so far as this is reasonable with respect to road conditions and the driver's wishes as they were assumed by the system.

6 Claims, 2 Drawing Sheets

U.S. PATENT DOCUMENTS

| | | | | | |
|---|---|---|---|---|---|
| 4,146,108 | A | | 3/1979 | Yasuo | |
| 4,734,574 | A | * | 3/1988 | Tanaka | 250/221 |
| 4,799,570 | A | * | 1/1989 | Andersson et al. | 303/3 |
| 4,817,767 | A | * | 4/1989 | Seibert et al. | 188/348 |
| 4,840,248 | A | * | 6/1989 | Silverman | 250/221 |
| 5,158,343 | A | * | 10/1992 | Reichelt et al. | 303/113.4 |
| 5,178,441 | A | * | 1/1993 | Heibel et al. | 303/113.4 |
| 5,210,522 | A | * | 5/1993 | Hoekman et al. | 340/467 |
| 5,261,730 | A | * | 11/1993 | Steiner et al. | 303/113.4 |
| 5,278,764 | A | * | 1/1994 | Iizuka et al. | 303/191 |
| 5,286,099 | A | * | 2/1994 | Fujita et al. | 303/125 |
| 5,332,056 | A | * | 7/1994 | Niiba et al. | 303/193 |
| 5,332,057 | A | * | 7/1994 | Butsuen et al. | 303/125 |
| 5,342,120 | A | * | 8/1994 | Zimmer et al. | 303/113.4 |
| 5,410,148 | A | * | 4/1995 | Barron, Jr. et al. | |
| 5,427,442 | A | * | 6/1995 | Heibel | 303/114.3 |
| 5,447,363 | A | * | 9/1995 | Fukamachi | 303/125 |
| 5,505,526 | A | * | 4/1996 | Michels | 303/155 |
| 5,564,797 | A | * | 10/1996 | Steiner et al. | 303/113.4 |
| 5,586,814 | A | * | 12/1996 | Steiner | 303/113.4 |
| 5,589,817 | A | * | 12/1996 | Furness | 340/467 |
| 5,669,676 | A | * | 9/1997 | Rump et al. | 303/125 |
| 5,719,769 | A | * | 2/1998 | Brugger et al. | 303/155 |
| 5,797,663 | A | * | 8/1998 | Kawaguchi et al. | 303/193 |
| 5,835,008 | A | * | 11/1998 | Colemare, Jr. | |
| 5,904,215 | A | * | 5/1999 | Ikeda | 303/155 |
| 5,921,641 | A | * | 7/1999 | Lüpges et al. | 303/191 |
| 6,135,578 | A | * | 10/2000 | Clar et al. | 303/114.3 |

FOREIGN PATENT DOCUMENTS

| | | | |
|---|---|---|---|
| DE | 41 20 069 | | 1/1992 |
| DE | 4102496 | * | 2/1992 |
| DE | 40 29 334 | | 3/1992 |
| DE | 42 17 409 | | 12/1993 |
| DE | 43 25 940 | | 12/1994 |
| DE | 44 22 982 | | 1/1995 |
| DE | 44 23 966 | | 1/1995 |
| DE | 44 38 966 | | 12/1995 |
| DE | 195 34 562 | | 3/1996 |
| DE | 195 03 451 | | 5/1996 |
| DE | 195 41 318 | | 5/1996 |
| DE | 195 03 622 | | 8/1996 |
| FR | 2598008 | * | 10/1987 |
| FR | 2685896 | * | 7/1993 |
| GB | 2 053 394 | | 2/1981 |
| JP | 61102345 | * | 5/1986 |
| JP | 542861 | * | 2/1993 |
| JP | 5208662 | * | 8/1993 |

* cited by examiner

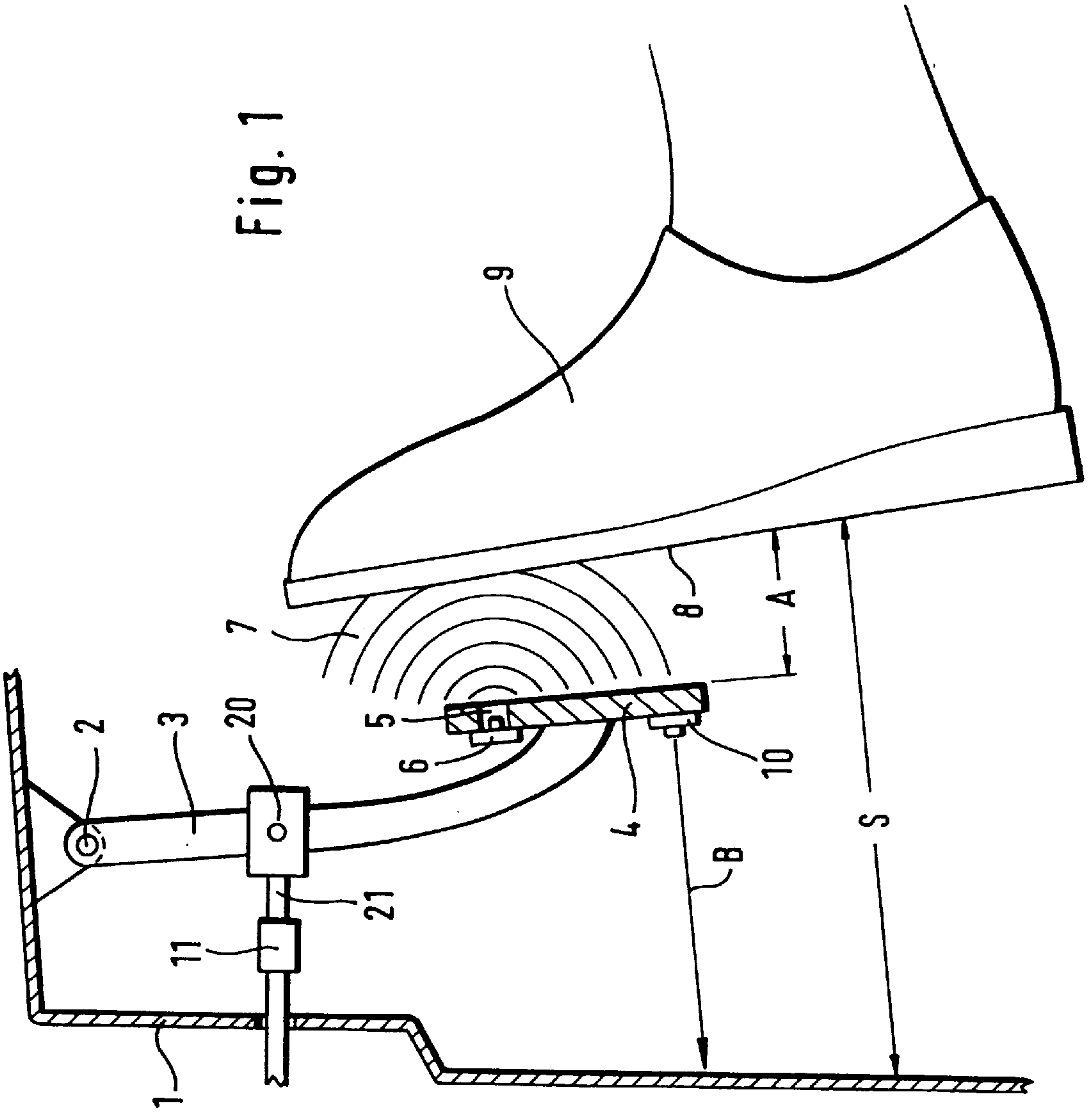
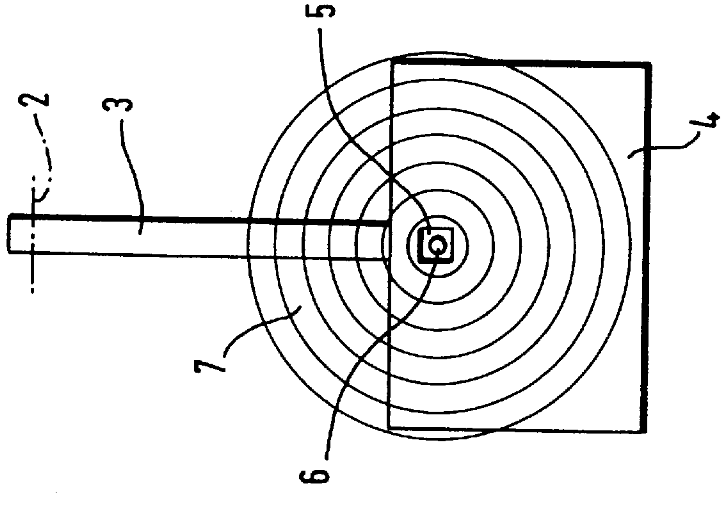
Fig. 2

AUTOMATICALLY ACTUATED BRAKING SYSTEM

BACKGROUND OF THE INVENTION

The present invention relates to a method of automatically applying vehicle brakes in response to a movement of a driver's foot.

DE-PS 40 28 290 discloses that a maximum brake pressure can be built up in dependence of the speed with which the brake pedal is depressed so as to cause an optimal braking of the vehicle. However, since the stopping time is made up of a reflex time, a reaction time, a brake response time, and the actual braking time, it may take a relatively long period of time before the vehicle stops or reaches the desired state of deceleration due to the reflex time, the remaining reaction time and the brake response time. In this connection, reflex time is understood to be the time that the driver needs to realize that he has to decelerate. The reaction time is the time that it takes the driver to remove his right foot from its current position (e.g. on the gas pedal) and to place it on the brake pedal. The brake response time describes the time until the driver initiates the braking procedure, i.e. until the vehicle actually begins to accelerate negatively, i.e. to decelerate. For this purpose, the brake pedal has to overcome a certain idle distance and suitable pressure has to be built up so that the brake pads are applied to the brake discs with sufficient force. The actual braking time is the time that is then still needed to stop the vehicle or until the vehicle reaches the desired lower speed.

Consequently, it becomes evident that the object of DE-PS 40 28 299 only causes the braking time to be reduced, since the brake is automatically applied with optimal force. The previously known brake system presupposes, however, an automatically controlled brake force, since the optimal brake pressure is considerably affected by weather and road conditions (dry roadway, icy roadway). It is known from DE-GM 8911963 that the brake system can be made to respond as soon as the driver's right foot leaves the gas pedal to depress the brake pedal. In this way, considerable reaction time and brake response time are saved. However, this system calls for a separate manipulation by the driver to bring the vehicle into a state, in which the desired behavior actually occurs. This manipulation can take the form of activating a switch with a foot (the left one) or hand. A disadvantage in this connection is that the driver has to intentionally move a switch in a dangerous situation in order to reduce the reaction time and brake response time.

From DE-OS 44 22 664 it is known that a signal can be transmitted to the brake system when the right foot moves very quickly from a first position to a second position, with such signal causing a braking procedure. In this respect, a change in the position of the foot is understood to be moving the foot from the gas pedal to the brake pedal. Although this does allow a considerable reduction in the reaction time in special cases, it must be taken into consideration that the position of the foot frequently is not changed prior to a necessary braking, for example when the vehicle is being braked on a downhill road without any prior activation of the gas pedal. The same also holds true for control devices that hold the vehicle speed constant without any activation of the gas pedal (Tempomat, Cruise Control). The above-mentioned known device also does not ensure that a massive braking procedure is not initiated when the driver quickly takes the foot from the gas pedal, for example for changing gears, and comes into the vicinity of the brake pedal.

U.S. Pat. No. 3726369 proposes that the brake system be activated automatically as soon as the driver's foot is taken from the gas pedal and placed on the brake pedal. For this purpose, two sensors are provided which control the movement of the foot. In principle the object of this document corresponds to the devices described in DE-OS 44 22 664, wherein the latter device saves additional reaction time in that the driver's foot does not have to come into contact with the brake pedal for initiating a braking reaction, but that a braking reaction occurs when a certain movement is detected in the vicinity of the brake pedal by an appropriate sensor.

The object of the invention is to adapt an automatically executed braking procedure as far as possible to the dangerous situation. In particular it should be prevented that an inappropriately strong braking procedure is initiated in a situation where this would result in far greater risks to the driver than the possible benefits of an automatic braking. Thus, it is the intention of the invention to render the initiation of the braking procedure independent of a previous activation of the gas pedal. Furthermore, it is the object of the invention to base the type and scope of actuation of the brake not only on one single procedure but to make it dependent on a combination of measured data and to adapt the automatic reaction of the brake to all of the measured data combined.

SUMMARY OF THE INVENTION

The object is achieved by making the type and scope of the automatic actuation of the brake system dependent on the size of an individual measured value or a combination of different types of measured values resulting from a movement of a foot relative to the brake pedal. In this connection there are numerous possibilities of actuation. For one the brake system may only be precharged, which means that although the brake pressure is increased to such an extent that the brake pads are applied to the brake disc, no braking procedure is initiated, i.e. the speed of the vehicle is not reduced by the brake. Another possibility would be initial braking, i.e. to apply the brake pads to the brake disc with a defined brake force for a specified period of time. The brake force needed for this purpose can be very low (e.g. 5 to 20 bar can be applied), i.e. a pressure range that is handled during a sudden change of pressure in a booster (jump-in function, jump-in value) (no ABS needed). Finally the optimal brake force can be applied to the brake discs, i.e. the optimal pressure can be made available automatically in the brake system. However, this means that there has to be a controlled brake system (ABS), since the optimal brake force depends significantly on the road conditions, the load carried by the vehicle and other factors, which can only be governed by an appropriate control system. If such a control system is not available, the preprogrammed automatic braking procedure must always only go so far that it doesn't result in any danger to the vehicle, also not under unfavorable conditions. Of course, it is possible to program or, if necessary, adapt the vehicle to seasons or the area where the vehicle is driven, since, for example, icy roadways are highly unlikely during certain times of the year or in certain regions. Hence, certain states defined by parameters can be provided for comparison with the measured values.

Based on the information provided above, it is evident that the type of actuation of the brake system not only should be uncritical but also should prevent any accidental actuation of the automatic braking procedure as far as possible. In this respect, measuring the movement of the foot with respect to the brake pedal is recommended. On the one hand this ensures that an initiation of braking procedures is improbable when it is not actually intended (does not depend on depression of the gas pedal); on the other hand a considerable amount of reaction time is saved by already actuating the brake system whenever it can be expected with a high degree of probability that the driver will want to brake. Finally, the chronological sequence of the change of position above the brake pedal (speed of change or foot acceleration) can indicate how strongly the driver wants to brake. When the driver's foot accelerates very quickly or the speed of movement towards the brake pedal is very fast, it can be assumed that the driver actually wants a strong braking procedure. This is also correct in view of the fact that he would put on the brakes strongly anyway, since he couldn't stop or pull back his foot in time. Yet, the type of brake actuation in this case could also be made dependent on the distance between the driver's foot and the surface of the brake pedal. If the acceleration or foot speed occurs at a large distance from the brake pedal, then it would not seem appropriate to initiate a strong braking procedure at this time (initial braking). In this case, precharging the brake would suffice, i.e. making the brake pads slide lightly on the brake discs, since thereby the idle path of the pedal is obviated and, hence, the required braking distance is reduced. Thus, this type of actuation would only give rise to a different feeling of confirmation on the brake pedal for the driver. However, the vehicle is not jerked by the initial braking and the brake linings are not subjected to unnecessary wear. For this purpose, the brake system can be designed in such a way that the brake pedal automatically moves towards the braking position. As a result, the foot need depress the pedal only a short distance and can exert only an insignificant amount of force in order to actuate a force sensor.

However, in order to also help the driver when he has placed his foot on the brake pedal, the actuation speed or force of the brake pedal can be detected. In this case, brake pedal refers to any kind of brake actuation element that triggers a corresponding braking procedure whenever a force is applied, either by depressing the pedal or applying force. A force sensor is not necessarily needed for this purpose. Nonetheless such a force sensor may prove very expedient in brake systems with special control devices, particularly when these systems do not include measures for detecting the brake pressure or the actuating path and if the driver's foot can depress the pedal only a very short distance.

As was already discussed above, the objective is to achieve as high a braking effect as possible without endangering or disturbing the driver. Therefore, it is advantageous to adapt the power of the braking procedure to the speed or the acceleration of the foot movement. The power of the braking procedure can additionally or exclusively be rendered dependent on the force with which the foot is applied to the brake pedal. Hence, the present invention provides a possibility of making the power of the braking dependent on several parameters. This can include exclusively, but also additionally, that the power of the braking procedure be made dependent on a safety signal that takes into consideration ambient dangers, wherein said safety signal could be determined by the distance to the vehicle ahead of one's own vehicle, one's own vehicle speed and the relative speed between the two vehicles. In addition, when there is a controlled brake system (ABS), its control behavior can be used. In this case it is possible to automatically apply the full brake pressure on the brake when it is detected that the driver wants to brake strongly or when a strong braking is necessary due to a danger signal, and the control system of the brake system can help compensate any difficulties arising in connection with the condition of the roadway surface.

Only precharging or light initial braking should be striven for in uncontrolled brake systems, as occurs, for example, with the jump-in function of a booster.

The strategy is to actuate the brake system as appropriately as possible in accordance with the braking needs of the driver as detected through the measured signals, taking into consideration any possible danger to the driver. Whereas the system cannot determine precisely whether or how strongly the driver wants to brake while the foot is still above the brake pedal, the desire to brake is quite clear when the brake pedal actuation exceeds a certain speed or a certain force, and the speed as well as the acceleration of the foot movement can be taken as the measure for the desired brake force. Naturally this presupposes that the brake system still allows the pedal to be depressed a significant distance when the foot is placed on the pedal (e.g. when the foot is placed on the pedal very slowly).

The value of the safety signal with respect to a vehicle ahead can be included.

In a particularly expedient system, several signals measured parallel to one another can be linked. If, for example, such a measurement determines that the driver's desire to brake is comparably weak because his foot is resting above the brake pedal and a safety signal indicating a vehicle in front is emitted at the same time, these two values can be united and a need for a higher brake force will be determined. The same thing applies when the values combined to form the safety signal are viewed individually, i.e. the vehicle's own speed, the relative speed and the distance to the vehicle in front. In this case, the values could also be assigned to individually determined brake pressure values, which are then combined and result in the conclusion that a higher brake force is needed. Correspondingly a weak danger signal alone can be used to precharge the brake system or to initiate light initial braking.

A first sensor device monitoring and measuring the movement of the brake pedal itself and/or the movement of the foot above the brake pedal can be an infrared sensor that measures the distance between the foot and the sensor by means of an infrared ray. The sensor can as well be capacitive and determine the field changes (deviating field resistance of the foot) resulting from the movement of the driver's foot. Another possibility would be to use Hall probes to measure at least the distance or the movement of the pedals. In the same way, optical sensors or ultrasonic sensors could be used. As mentioned before, the important point is that the form of the automatic actuation, i.e. precharging, slight initial braking, strong initial braking or a full braking according to the driver's wish, should always depend on the value of one or several measuring results.

The sensor for detecting the movement of the foot relative to the brake pedal can be located in the brake pedal in a hole facing the foot, whereby the sensor itself is protected by the pedal, but can monitor the space above the pedal through an opening, through which, for example, it can radiate infrared or optical signals. A single sensor, which can, for example, be mounted somewhere on the splashboard, can monitor both the movement of the foot and the movement of the pedals. But it can be advantageous to have a second sensor mounted for detecting the movements of the brake pedal. The advantage offered by this embodiment is that the measured signals can be unequivocally assigned to a foot above the pedal and a foot on the pedal. Moreover, this makes it possible to adjust the system more easily and accurately, because it is known that the first sensor measures the distance between the foot and the pedal at height 0 when the second sensor determines the beginning of a movement of the pedal.

A force sensor may be included exclusively or additionally in the first sensor device. In particular, this would allow controlled brake systems, whose control also depends on the pedal force exerted by the driver, to be actuated comparably easily. This would lead to a considerable simplification of the control system as well as corresponding cost reductions. The force sensor can be mounted in the path of force transmission leading to the inside of the booster. It can, for example, be a piezoelectric sensor on the surface of the pedal, a force sensor in the piston rod or in a force-transmitting joint.

The safety signal mentioned above can be obtained by measuring the vehicle speed, at least relative to a vehicle ahead.

For this purpose, an arithmetic unit can, for example, be used, which appropriately evaluates and weights the individual danger parameters. A corresponding arithmetic unit can also be used in connection with the arithmetic units applied for the driver's foot and the brake pedal.

The values provided by the individual arithmetic units then can be linked with each other appropriately in a coordinating unit, giving rise to a suitable value that determines the brake pressure to be set automatically.

With respect to the brake system described herein, it is particularly expedient to provide a brake pressure transducer which can be actuated independently of the driver's foot (independent assist actuation) and, hence, determines the required type and extent of actuation (e.g. booster, pump, pressure accumulator.

An exemplary embodiment of the invention is explained on the basis of the following drawings.

BRIEF DESCRIPTION OF THE DRAWINGS

FIG. 1 shows a brake pedal with sensors according to the present invention;

FIG. 2 is a symbolic top-view representation of the brake pedal according to FIG. 1.

DETAILED DESCRIPTION OF THE DRAWINGS

Figure 3:
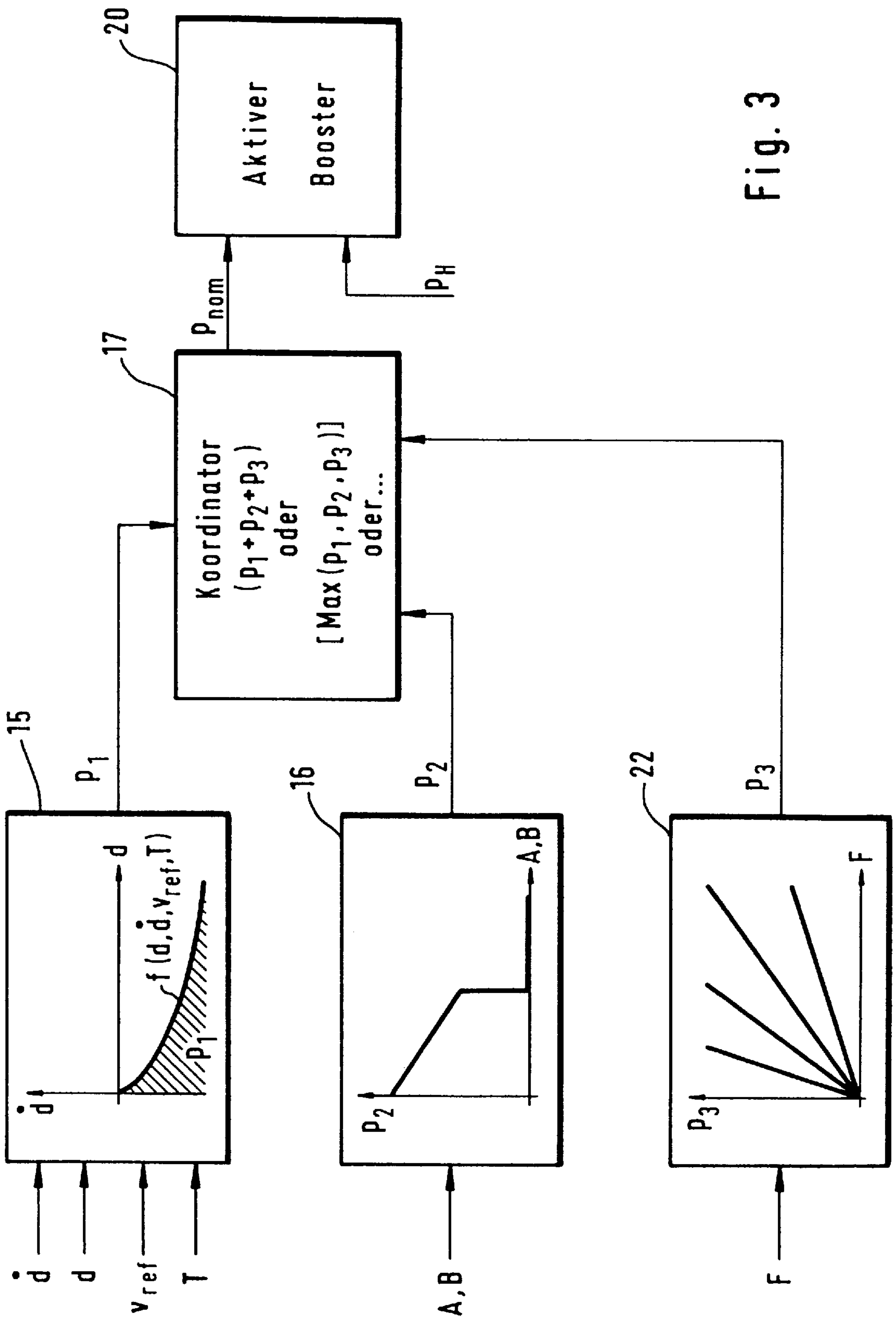
FIG. 3 shows how several signals indicating the required brake pressure are linked to activate a brake pressure transducer.

In FIG. 1 the inside surface of a vehicle in the vicinity of the brake pedal is shown. This is limited by the splashboard 1, which is fixed in relation to the body of the vehicle. The brake lever 3 is suspended on the splashboard 1 or on another part that is fixed on the vehicle by means of a bearing 2. The brake lever 3 has a brake pedal 4, and both parts are connected to one another in one piece. There is an opening 5 in the brake pedal 4, at whose left end (please refer to FIG. 1) a first sensor 6 is mounted. Said sensor can be an infrared sensor, an ultrasonic sensor, an optical sensor, a capacitive sensor or another suitable sensor. The sensor radiates a field 7, which, in simplified terms, is approximately ball-shaped. At the same time, the sensor is equipped with a measuring device (not shown), which is used to measure the distance A of the bottom shoe sole 8 of the foot 9. Not only distance A but also the speed A and the acceleration power of the foot in relation to a reference point can be determined by means of suitable evaluation and/or calculation devices (not shown). The surface of the brake pedal 4 is given preference as the reference point. These values can be used to determine what type and form of brake actuation is required. For this purpose, the sensor can also be mounted at another place in the floor area, for example on the splashboard below the brake pedal 4.

A capacitive sensor can preferably be used as the first sensor. For this purpose, electrodes having a capacitive effect on one another are mounted on the side of the brake pedal 4 facing towards the foot 9. These electrodes can be two large capacitive areas basically arranged on one level at a certain distance from each other. The surfaces could also be curled together like a spiral. A measuring frequency is applied to the capacitor formed in this way. The approaching foot causes the field (capacity) to be detuned since its relative permittivity deviates from the surroundings, making it possible to measure the foot's speed of approach.

Another possibility would be to use an ultrasonic sensor. Its membrane should be positioned in such a way that it ends approximately at the opening's 5 limiting edge that faces towards the foot, so that the ultrasonic transformer is fitted in the opening. In FIG. 1 a second sensor 10, which also is a position sensor, is indicated on the left bottom side of the pedal 4 (see FIG. 1). This position sensor measures the path traveled by the pedal 4 as soon as the foot 9 touches the pedal 4. For this purpose, said position sensor does not have to be mounted on the bottom side of the pedal with its direction of measurement facing towards the splashboard 1. It will suffice if it is mounted at an appropriate position, from where it can measure either directly or indirectly the path traveled by the pedal 4. It can, for example, also be mounted at a suitable place on the brake lever 3 or on the piston rod 21 connected to the brake lever via a joint 20, which leads to a booster that is not shown. Hence, the path traveled by the pedal 10 can also be measured within the booster. Thus, the sensor 10 describes the action of the foot on the pedal, and an appropriate brake pressure can be set automatically in the brake system depending on the path traveled by the pedal B or the pedal speed $\dot{B}$ or the pedal acceleration $\ddot{B}$. However, it also appears possible to have the functions of sensors 6 and 10 be carried out by one single sensor, which, for example, monitors the distance, any change in distance or the acceleration of the bottom surface of the foot, irrespective of whether the foot touches the pedal 4 or not.

Since, in the present invention, the brake already is actuated in a suitable manner as soon as the foot 9 approaches the pedal 4, the brake system according to the present invention is outstandingly suitable for determining the brake pressure with the aid of a force sensor when the foot touches the pedal. Since the brake already has automatically overcome the customary idle path before the foot 9 touches the pedal 4, the foot depresses the pedal only negligibly small distances, whereas the brake pressure in the brake system is almost exclusively determined by the force exerted by the driver's foot. Consequently, the position sensor 10 will not be necessary and can be replaced by the force sensor 11, which is symbolically integrated in the piston rod 21 in FIG. 1. Naturally the force sensor 11 can be used in addition to the position sensor 10.

FIG. 2 is a top view of the brake pedal 4 with the opening 5 as well as the indicated spherical (preferably essentially ball-shaped) measuring field 7. The sensor mounted in the opening can be held by webs running radially from the edge of the opening, so that dirt can fall off between the webs.

Three arithmetic units 15, 16, 22 are shown in FIG. 3. A series of values measured by a second sensor device, which describe the danger of the vehicle colliding with a vehicle in front, are input into the arithmetic unit 15. These values are the distance d to the vehicle in front, the change in distance per time unit $\dot{d}$, the speed of one's own vehicle $v_{Ref}$, and T, a defined time that describes the desired safety time up to a collision. These data are linked in the arithmetic unit, which has at its disposal tables that describe the brake pressure to be set on the basis of the distance, d, $\dot{d}$, $v_{Ref}$, T as well as other parameters, if necessary. In this way, the desired brake pressure p1 can be determined.

On the basis of the distance A or B and/or $\dot{A}$,power or $\dot{B}$, $\ddot{B}$, the arithmetic unit 16 determines a suitable brake pressure p2 that is to be applied in the brake system. In the third arithmetic unit 22, a value corresponding to the foot force F is provided. Due to the logically linked parameters, a suitable brake pressure p3 can be determined from this by means of the tables contained in arithmetic unit 22. Of significant importance in the present invention is the coordinator 17, which determines a coordinated pressure value based on the output vales p1, p2, p3, each of which individually describes an appropriate pressure that is to be applied by the brake system. As a rule, this coordinated pressure value will be larger than each of the three individual pressure values p1, p2, p3. It can, for example, be made up of the sum of the three pressure values p1, p2, p3. It can, however, also be a maximum pressure value that is formed as a function of p1, p2, p3, which lies far below the sum of the individual pressure values p1, p2, p3. The resulting pressure $p_{nom}$ is supplied to a brake pressure transducer that is actuated accordingly. Said brake pressure transducer, for example, can consist of an active booster that can be actuated externally, it can also be a pressure fluid storage unit, a pressure fluid pump, a hydraulic amplifier. The active booster is additionally actuated in the manner customarily used by means of a signal $P_H$, which corresponds to the actual value of the pressure in the main cylinder and serves to close the control loop. A precharging condition accompanied by a corresponding Pnom can be maintained in the brake system even though the driver releases the pedal.

Therefore, the following can be stated in particular: A system that was already proposed includes a control system for the longitudinal dynamics, which is provided for controlling methods of longitudinal dynamics exceeding the limit range (ABS/ASC function).

The task of the control unit is to unite such functions as automatic speed control, collision avoidance control (following a vehicle driving in front) and other control functions with respect to longitudinal dynamics as well as to supply these as effectively as possible to the actuators (brake, gearbox, engine) in case of a braking procedure with a certain limited deceleration. In the same way, the interface to the driver has to be maintained and state values (speed, distance, force, etc.) have to be input and output.

Control systems proposed up until now have always proceeded on the assumption that the control unit is no longer active when the driver intervenes (switching off the ICC system, stepping on the brake) and, consequently, cannot initiate any braking to support the driver. However, control systems aiming for collision avoidance, some of which are always active and also permit braking procedures with a greater deceleration, exhibit the disadvantage that an erroneous detection may give rise to a full braking procedure.

Studies have shown that brake systems with a certain degree of filling (precharged brake system with 5–10 bar pressure) carry out the subsequent driver-initiated braking quicker and with less scatter. Thus, braking distance is gained. In the same way research has shown that a full braking procedure (for a certain time T until the driver takes over) initiated when movement of the driver's foot is detected, i.e. from the gas pedal to the brake pedal, can reduce the braking distance, but also can give rise to great risks and cause the driver to be irritated by erroneous brake actuation.

It is proposed herein that determination of the distance/the relative speed in respect to a vehicle in front by means of a distance sensor and/or detection of the driver's foot approaching the brake pedal be used to precharge the vehicle's brake. Fulfillment of one of the two conditions (short distance/high relative speed, foot movement) alone will not result in a marked deceleration of the vehicle. Nevertheless, the brake system will be pre-applied and, hence, critical time that the driver normally needs for this procedure will be saved. The fulfillment of both conditions makes a large precharging of the brakes expedient, since it can be expected with some certainty that the driver will brake.

When the driver's foot approaches the brake pedal, a sensor determines the distance between the foot and the pedal. As soon as a certain threshold is crossed, a precharge pressure $p_2$ is generated. This can remain constant as the driver's foot continues to approach the brake pedal, but can change as a function of the distance and the change in the distance. The pressure determined is supplied to the brake system by means of an active booster.

However, precharging can also be caused by insufficient distance and/or high speed of one's own vehicle, in which case the distance sensor determines the distance and the chronological derivation of the distance (relative speed) to a vehicle driving in front. The safety distance is composed of a time T (time to collision) and the vehicle's own speed $v_{ref}$. The data provided by the sensor can be used to obtain an approximate calculation of the acceleration of the vehicle driving in front $\dot{v}_1$. The decision whether precharging is to be initiated and the extent of such precharging $p_1$ is made on the basis of the sensor data in relation to the safety distance and the vehicle's own speed. A criterion in this connection can be exceeding a limit value (or safety value) such as, for example, $$d = T * v_{ref} - \frac{v_{ref}^2}{2 * \dot{v}_{ref}^2} + \frac{v_1^2}{2 + \dot{v}_1^2}$$

where the pressure value $p_1$ can be a function of the degree that the limit value is exceeded. In this connection, $v_1$ is the speed of the vehicle in front and $\dot{v}_1$ is its acceleration. The limit value can be formed by curves determined by experiment.

Both requirements posed with respect to precharging are combined via a coordinator function. Said coordinator function can consist of forming the sum total of both pressure values, a maximum function or other operators.

What is claimed is:

1. A method for actuation of a brake system of a vehicle, wherein said brake system is equipped with a brake pedal, comprising the following steps:

measuring a quantity relating to a change of position of a foot approaching the brake pedal;

comparing the measured quantity with at least one reference quantity to obtain a result; and automatically actuating the brake system.

2. A method according to claim 1, wherein the nature of automatically actuating the brake system depends on the result.

3. A method according to claim 1, wherein actuating the brake system further includes measuring results of the performance of the brake system obtained during at least one of the following operations: precharging, initial braking, adjustment of an appropriate brake pressure and application of a maximum brake pressure.

4. A method according to claim 1, wherein the reference quantity relates to the change of position of a foot approaching the brake pedal, and wherein the actuating step includes a light braking operation when a threshold value is reached.

5. A method according to claim 1, wherein the reference quantity relates to the position of the foot, and wherein the actuating step includes a light braking operation when a threshold value is reached.

6. A method according to claim 1, wherein the measuring step further includes the steps of:

measuring in parallel at least two quantities being selected from: a position of a foot, a change of position of a foot approaching the brake pedal, a position of the brake pedal, a speed of the brake pedal, a force exerted by the foot on the brake pedal, a distance from the vehicle to a second vehicle, and a speed difference relative to the second vehicle, and the actuating step includes applying an increasing brake pressure as a function of the least two quantities measured.

* * * * *